(12) United States Patent
Ueda et al.

(10) Patent No.: US 11,062,832 B2
(45) Date of Patent: Jul. 13, 2021

(54) NONRECIPROCAL CIRCUIT ELEMENT AND METHOD OF MANUFACTURING THE SAME

(71) Applicant: Mitsubishi Electric Corporation, Tokyo (JP)

(72) Inventors: Tetsuya Ueda, Tokyo (JP); Hironobu Shibata, Tokyo (JP); Yukinobu Tarui, Tokyo (JP); Hidenori Ishibashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 130 days.

(21) Appl. No.: 16/476,602

(22) PCT Filed: Feb. 26, 2018

(86) PCT No.: PCT/JP2018/006994
§ 371 (c)(1),
(2) Date: Jul. 9, 2019

(87) PCT Pub. No.: WO2018/163888
PCT Pub. Date: Sep. 13, 2018

(65) Prior Publication Data
US 2021/0142935 A1 May 13, 2021

(30) Foreign Application Priority Data
Mar. 7, 2017 (JP) .............................. JP2017-042467

(51) Int. Cl.
*H01F 7/02* (2006.01)
*H02K 1/02* (2006.01)
*H01F 41/02* (2006.01)

(52) U.S. Cl.
CPC ......... *H01F 7/0215* (2013.01); *H01F 7/0242* (2013.01); *H01F 41/0253* (2013.01); *H02K 1/02* (2013.01)

(58) Field of Classification Search
CPC .. H01F 7/0215; H01F 7/0242; H01F 41/0253; H02K 1/02
See application file for complete search history.

(56) References Cited

U.S. PATENT DOCUMENTS 5,786,736 A * 7/1998 Dejima ................... H01P 1/387
333/1.1
2016/0211564 A1 * 7/2016 Ishibashi ................. H01P 1/38

FOREIGN PATENT DOCUMENTS

| JP | H09121104 A | 5/1997 |
| JP | 2007306634 A | 11/2007 |
| JP | 2015080056 A | 4/2015 |

OTHER PUBLICATIONS

International Search Report (PCT/ISA/210) dated May 15, 2018, by the Japan Patent Office as the International Searching Authority for International Application No. PCT/JP2018/006994.

* cited by examiner

*Primary Examiner* — Mohamad A Musleh
(74) *Attorney, Agent, or Firm* — Buchanan Ingersoll & Rooney PC

(57) ABSTRACT

A cavity is formed in a surface of a dielectric component on the permanent magnet side. The cavity has a bottom surface extending in a direction along one main surface and a side surface extending in a thickness direction crossing the bottom surface. At least a part of the permanent magnet is disposed in the cavity. A surface of at least a part of the permanent magnet disposed in the cavity is fixed to both of the bottom surface and the side surface through an adhesive.

7 Claims, 13 Drawing Sheets

NONRECIPROCAL CIRCUIT ELEMENT AND METHOD OF MANUFACTURING THE SAME

TECHNICAL FIELD

The present invention relates to a nonreciprocal circuit element and a method of manufacturing the same.

BACKGROUND ART

Nonreciprocal circuit elements such as isolators or circulators are generally mounted on circuit boards of microwave devices such as microwave amplifiers and microwave oscillators. The element body of a nonreciprocal circuit element of this type is required to have a structure simpler than conventional ones and be easy to assemble and highly reliable, with size reduction and weight reduction of the circuit board of the microwave device.

A conventional nonreciprocal circuit element easy to assemble is disclosed, for example, in Japanese Patent Laying-Open No. 2007-306634 (PTL 1). In the nonreciprocal circuit element in Japanese Patent Laying-Open No. 2007-306634, a stack of a dielectric component and a permanent magnet on a magnetic plate is pressed from above by a retainer. In Japanese Patent Laying-Open No. 2007-306634, the dielectric component has a through hole passing through in a direction crossing its main surface, and the magnetic plate is stored inside the through hole. In this publication, the permanent magnet is stored on a bottom surface of the stamped retainer. According to this publication, storing the components in this way can suppress displacement of the disposed components.

CITATION LIST

Patent Literature

PTL 1: Japanese Patent Laying-Open No. 2007-306634

SUMMARY OF INVENTION

Technical Problem

The nonreciprocal circuit element in Japanese Patent Laying-Open No. 2007-306634 has a structure that can achieve high positional accuracy if the components can be installed at desired positions. Unfortunately, in the nonreciprocal circuit element in Japanese Patent Laying-Open No. 2007-306634, since the components may give repulsive force to each other due to the effect of magnetic force and be displaced during the process of installing the components, the installation process has to be performed using a tool and a facility having a mechanism that retains the components in order to suppress the displacement. More specifically, in Japanese Patent Laying-Open No. 2007-306634, the retainer (cap) has the function serving as a magnetic yoke that controls the path of magnetic line of force of the permanent magnet and is formed of a ferromagnetic material. To install the retainer on the permanent magnet, a retaining mechanism having a retaining force that can overcome the magnetic force acting between them is required. For this reason, assembling the nonreciprocal circuit element in Japanese Patent Laying-Open No. 2007-306634 by an automechanism involves complicated processes, leading to a complicated facility configuration.

The present invention is made in view of the problem above and is aimed to provide a nonreciprocal circuit element improved in quality of the bonded site for fixing components and a method of manufacturing a nonreciprocal circuit element that can be assembled with an automechanism that does not have a complicated configuration.

Solution to Problem

A nonreciprocal circuit element according to the present invention includes a magnetic plate, a dielectric component, a permanent magnet, a magnetic yoke, and a circuit board. The magnetic plate has one main surface and the other main surface and has a plurality of input/output terminals. The dielectric component is connected on one main surface of the magnetic plate. The permanent magnet is connected to the dielectric component on a side opposite to the magnetic plate. The magnetic yoke is connected to the permanent magnet on a side opposite to the magnetic plate. The circuit board is connected to the other main surface side of the magnetic plate and has a plurality of signal conductors. The permanent magnet can control transmission of an electrical signal from each of a plurality of signal conductors to the corresponding one of the input/output terminals. A cavity is formed in a surface of the dielectric component on the permanent magnet side. The cavity has a bottom surface extending in a direction along one main surface and a side surface extending in a thickness direction crossing the bottom surface. At least a part of the permanent magnet is disposed in the cavity. A surface of at least a part of the permanent magnet disposed in the cavity is fixed to both of the bottom surface and the side surface through an adhesive.

In a method of manufacturing a nonreciprocal circuit element according to the present invention, first of all, a magnetic plate having one main surface and the other main surface and having a plurality of input/output terminals is formed. A dielectric component is connected on one main surface of the magnetic plate. A permanent magnet is connected to the dielectric component on a side opposite to the magnetic plate. A magnetic yoke is connected to the permanent magnet on a side opposite to the magnetic plate. A circuit board having a plurality of signal conductors is connected to the other main surface side of the magnetic plate. A cavity is formed in the dielectric component on a side connected with the permanent magnet. The cavity has a bottom surface extending in a direction along one main surface and a side surface extending in a thickness direction crossing the bottom surface. In the step of connecting a permanent magnet, a surface of at least a part of the permanent magnet disposed in the cavity is fixed to both of the bottom surface and the side surface through an adhesive, in a state in which at least a part of the permanent magnet is disposed in the cavity.

Advantageous Effects of Invention

The present invention can suppress displacement due to repulsive force in installing the magnetic yoke on the permanent magnet, with a simple configuration and simple and low-cost processes, and can provide a reliable nonreciprocal circuit element with a simple configuration.

DESCRIPTION OF EMBODIMENTS

Embodiments of the present invention will be described below with reference to the figures.

First Embodiment

Figure 1:
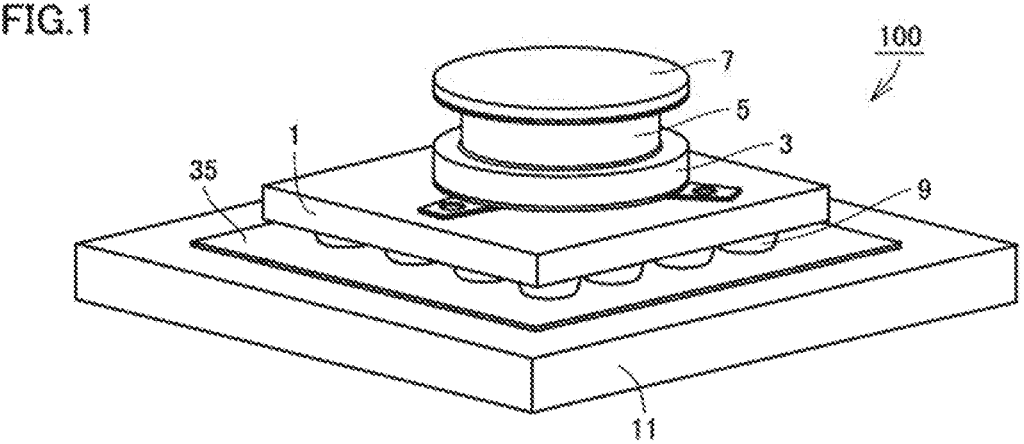
FIG. 1 is a schematic perspective view showing a configuration of a nonreciprocal circuit element in a first embodiment.
Figure 2:
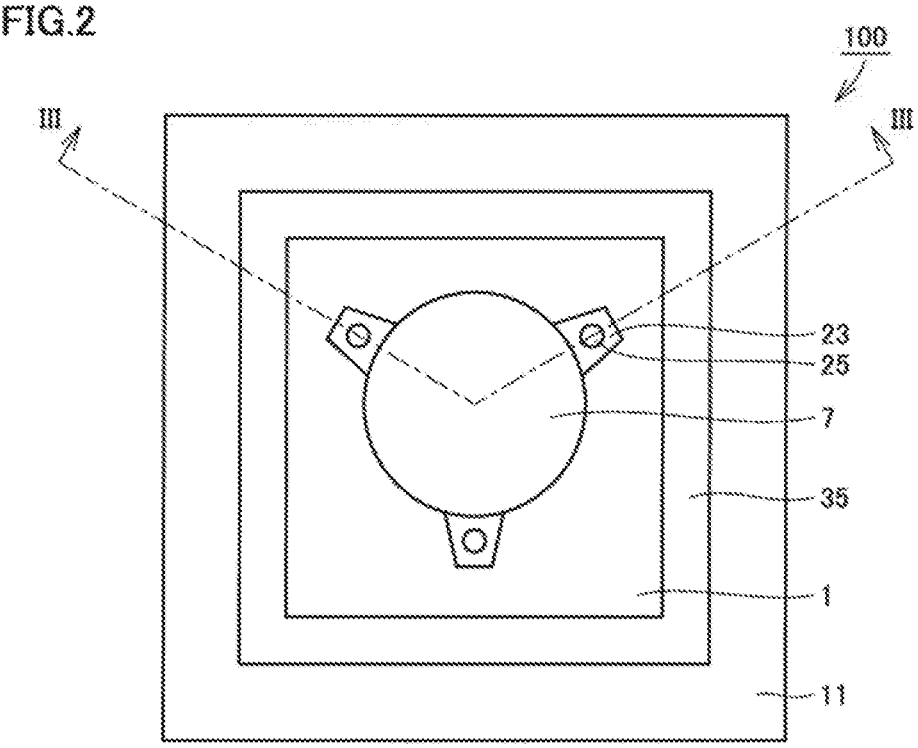
FIG. 2 is a schematic plan view of the nonreciprocal circuit element in the first embodiment in FIG. 1 as viewed from above.
Figure 3:
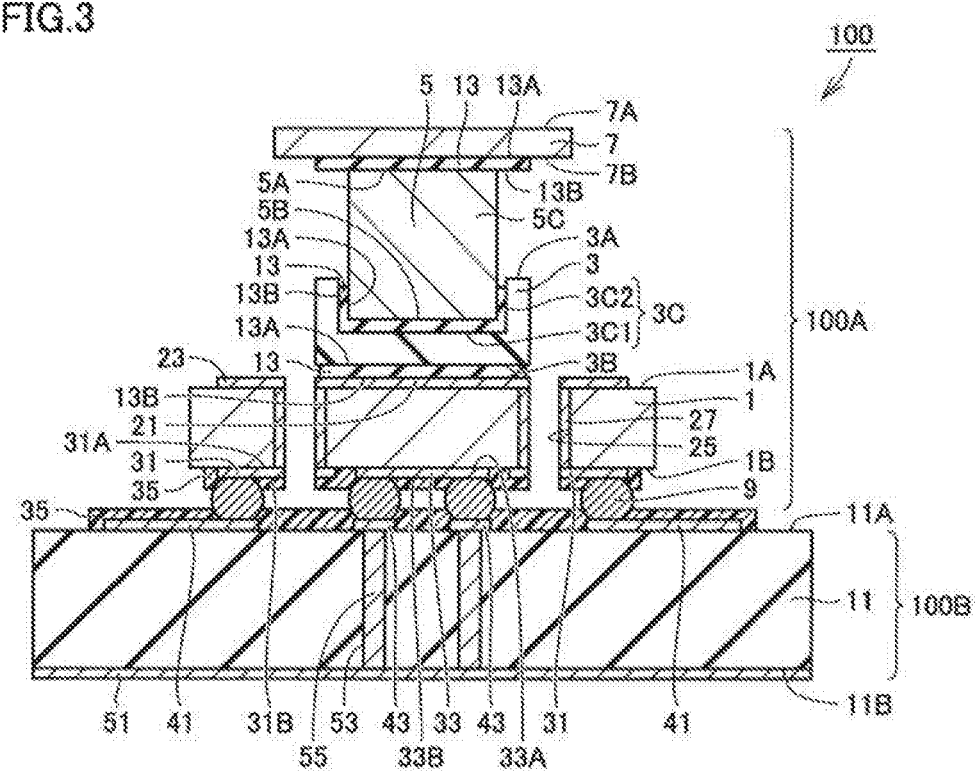
FIG. 3 is a schematic cross-sectional view showing a configuration of the nonreciprocal circuit element in the first embodiment.
Figure 4:
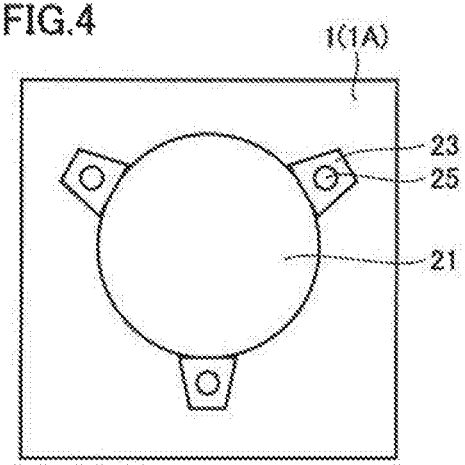
FIG. 4 is a schematic plan view showing one main surface side of a magnetic plate in FIG. 3 as two-dimensionally viewed.
Figure 5:
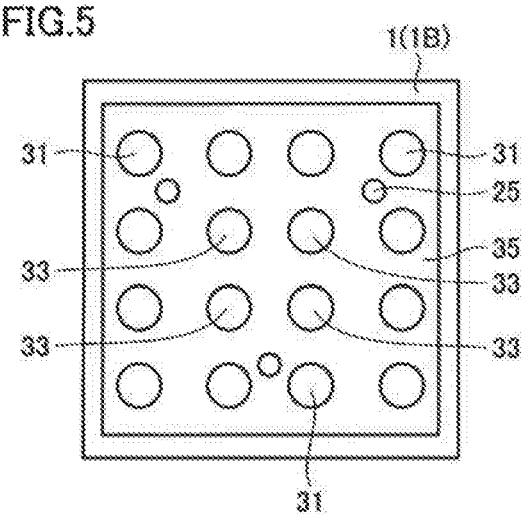
FIG. 5 is a schematic plan view showing the other main surface side of the magnetic plate in FIG. 3 as two-dimensionally viewed.

First, a configuration of a nonreciprocal circuit element in the present embodiment will be described using FIG. 1 to FIG. 5. FIG. 1 is a perspective view of the nonreciprocal circuit element in the present embodiment. FIG. 2 is a schematic plan view of the nonreciprocal circuit element in FIG. 1 as viewed from above in FIG. 1. FIG. 3 is a schematic cross-sectional view of a portion along line indicated by a broken line in FIG. 2. FIG. 4 is a schematic plan view showing the configuration of only the magnetic plate in FIG. 3 as viewed from above in FIG. 1 and FIG. 3. FIG. 5 is a schematic plan view showing the configuration of only the magnetic plate in FIG. 3 as viewed from below in FIG. 1 and FIG. 3. Referring to FIG. 1 to FIG. 5, a nonreciprocal circuit element 100 in the present embodiment includes an element body 100A and a mounting board 100B. Element body 100A mainly includes a magnetic plate 1, a dielectric component 3, a magnet 5, a magnetic yoke 7, and solder bumps 9 and is configured with these and members described later. A circuit board 11 is provided as mounting board 100B, and the members described later are provided on this circuit board 11.

The members and the configuration of element body 100A will now be described. Magnetic plate 1 has one main surface 1A and the other main surface 1B. One main surface 1A is a main surface on the upper side in FIG. 3, and the other main surface 1B is a main surface on the opposite side to one main surface 1A, that is, on the lower side in FIG. 3. Magnetic plate 1 is formed of, for example, a metal material mainly composed of iron, ferrite, or a composite magnetic material including magnetic powder and resin material. Among the materials above, it is preferable that magnetic plate 1 is formed of a ferrite-based material. Rare-earth garnet-type ferrite known as a material with low magnetic loss in a high frequency region is used as magnetic plate 1 in the present embodiment.

Magnetic plate 1 is preferably, for example, shaped like a flat plate having a rectangular or square shape in a two-dimensional view, that is, shaped like a rectangular parallelepiped. For example, magnetic plate 1 in the present embodiment has a square shape of 5.0 mm by 5.0 mm in a two-dimensional view, and the thickness, that is, the distance between one main surface 1A and the other main surface 1B is 0.5 mm.

A center electrode 21 is formed on one main surface 1A of magnetic plate 1. Center electrode 21 is formed, for example, to have a circular shape in a two-dimensional view, and interconnects 23 are formed so as to extend from the circumference of center electrode 21 to the outside. Interconnects 23 are provided, in total, at three places 120° apart from each other in the circumferential direction of the circular shape of center electrode 21 from the center in a two-dimensional view of center electrode 21. In other words, three interconnects 23 are disposed such that the center angle formed between three straight lines in the radial direction of center electrode 21 that connect center electrode 21 with three interconnects 23 is 120°.

A plurality of input/output terminals 31 and a ground electrode 33 are formed on the other main surface 1B of magnetic plate 1. For example, three input/output terminals 31 are formed, for example, at positions substantially overlapping interconnects 23 in a two-dimensional view. A plurality of interconnects 23 are thus connected to a plurality of input/output terminals 31. Ground electrode 33 is formed, for example, at a position substantially overlapping center electrode 21 in a two-dimensional view. Ground electrode 33 may be formed, for example, so as to cover the entire surface of the other main surface 1B. However, in FIG. 3 and the following cross-sectional views, ground electrode 33 is illustrated so as to be disposed on a part thereof for the sake of clarity.

A solder resist 35 is also formed on the other main surface 1B so as to cover the surfaces of input/output terminal 31 and ground electrode 33. Solder resist 35 is formed of a metal material such as chromium or an epoxy resin-based material. In the present embodiment, epoxy resin-based solder resist 35 is used.

The regions in which input/output terminals 31 and ground electrode 33 are exposed from solder resist 35, that is, input/output terminals 31 and ground electrode 33 exposed through openings formed in solder resist 35 are formed as pad electrodes.

Center electrode 21, interconnects 23, input/output terminals 31, and ground electrode 33 formed on magnetic plate 1 are preferably formed of, for example, a copper foil having a thickness of 40 µm to 70 µm.

A plurality of through holes 25 extending from one main surface 1A to the other main surface 1b are formed in magnetic plate 1. Each through hole 25 extends, for example, from a region two-dimensionally overlapping a part of interconnect 23 on one main surface 1A (see FIG. 4) to reach input/output terminal 31 on the other main surface 1B. Conductive film 27 is formed on an inner wall surface of through hole 25. Conductive film 27 may be formed of the same copper foil as interconnect 23. A plurality of through holes 25 thus connect one main surface 1A and the other main surface 1B of magnetic plate 1. As used herein the connection means electrical connection. However, it can be said that one main surface 1A and the other main surface 1B are mechanically connected through conductive film 27. With this configuration, center electrode 21 and interconnects 23 on one main surface 1A can be electrically connected with input/output terminals 31 and ground electrode 33 on the other main surface 19.

Magnetic plate 1 having the configuration described above is a member for allowing microwaves to produce magnetic resonance in the inside thereof.

Dielectric component 3 is connected on one main surface 1A of magnetic plate 1, that is, above center electrode 21 and interconnects 23 in FIG. 3 through a sheet adhesive 13. It is preferable that a material with low dielectric loss is used for the material that forms dielectric component 3. More specifically, dielectric component 3 is formed of, for example, a resin material such as polyimide or polytetrafluoroethylene (PTFE) or a ceramics material such as alumina. In the present embodiment, dielectric component 3 is formed of alumina.

Dielectric component 3 is formed, for example, so as to have a circular shape in a two-dimensional view and, for example, the diameter of its outermost portion is equal to or greater than 3.0 mm, in the present embodiment, 3.8 mm. Dielectric component 3 has one main surface 3A and the other main surface 3B. One main surface 3A is a main surface on the upper side in FIG. 3, and the other main surface 3B is a main surface on the opposite side to one main surface 3A, that is, on the lower side in FIG. 3. Since dielectric component 3 is basically columnar, the diameter of the outermost portion is almost constant from one main surface 3A to the other main surface 3B.

Dielectric component 3 has a cavity 3C recessed toward the other main surface 3B in one main surface 3A, that is, in a part of the surface on the magnet 5 side described later, specifically, at a central portion in a two-dimensional view. Cavity 3C has a bottom surface 3C1 serving as an inner wall surface extending in the right-left direction in FIG. 3 along one main surface 3A and a side surface 3C2 extending in the thickness direction crossing bottom surface 3C1, that is, in the up-down direction in FIG. 3. When dielectric component 3 has a circular shape in a two-dimensional view, bottom surface 3C1 of cavity 3C also has a circular shape in a two-dimensional view, and the entire cavity 3C including bottom surface 3C1 and side surface 3C2 has a cylindrical shape.

The diameter of the circular shape in a two-dimensional view of cavity 3C is, for example, greater than 3.0 mm, in the present embodiment, 3.2 mm. The thickness of the bottom portion from bottom surface 3C1 to the other main surface 3B of cavity 3C is preferably, for example, 0.2 mm to 0.5 mm, in the present embodiment, 0.3 mm. The thickness of this portion determines the distance between magnetic plate 1 and magnet 5 on cavity 3C, and the distance between magnetic plate 1 and magnet 5 affects the electrical characteristics of nonreciprocal circuit element 100. In this sense, the thickness of the bottom portion of cavity 3C is important.

The dimension of side surface 3C2 of cavity 3C extending in the up-down direction in FIG. 3, that is, the height dimension of the side portion that is obtained by subtracting the thickness of the bottom portion from the height in the up-down direction in FIG. 3 of the entire dielectric component 3 corresponds to the height dimension of a portion of magnet 5 that can be stored in cavity 3C as will be described later. Considering that magnet 5 stored in cavity 3C protrudes upward because of beveling of its corner and that the affixed position of sheet adhesive 13 is displaced in the height direction in FIG. 3, it is preferable that the height of the side portion of cavity 3C is equal to or greater than 0.1 mm. With this configuration, magnet 5 can be stably stored in cavity 3C. The height of the side portion of cavity 3C affects the stability of the posture of magnet 5 stored in cavity 3C. In this sense, the height of the side portion of cavity 3C is important.

It is preferable that the height dimension of the side portion is equal to or less than twice the thickness of the side portion from side surface 3C2 of cavity 3C to the side surface (front surface) of the outermost portion of dielectric component 3. As used herein the thickness of the side portion means the dimension with respect to the right-left direction in FIG. 3, that is, half the difference between the diameter of cavity 3C and the diameter of the outermost portion in a two-dimensional view of dielectric component 3. This configuration can ensure the mechanical strength of dielectric component 3. It is preferable that the surface area of side surface 3C2 that is the inner wall surface of cavity 3C is equal to or greater than one-twentieth of the area of magnet 5, which will be described later, stored in cavity 3C as two-dimensionally viewed, that is, the bottom area. This configuration can ensure a sufficient bonding strength of magnet 5 to side surface 3C2 by sheet adhesive 13. Based on the foregoing, in the present embodiment, the height of the side portion of cavity 3C is 0.3 mm.

Magnet 5 is formed, for example, so as to have a circular shape in a two-dimensional view. Magnet 5 has a diameter of, for example, 3.0 mm, smaller than the diameter of the circular shape in a two-dimensional view of cavity 3C in terms of being inserted into cavity 3C and has a thickness (the dimension in the height direction) of 1.0 mm. Magnet 5 also has one main surface 5A (the upper side in FIG. 3) and the other main surface 5B (the lower side in FIG. 3) on the opposite side, in the same manner as magnetic plate 1. A region between one main surface 5A and the other main surface 5B of magnet 5 is formed as a magnet side surface 5C. Magnet 5 is a member serving as a permanent magnet disposed in order to use a direct-current magnetic field in element body 100A. Magnet 5 is formed of, for example, a ferrite material, a samarium-cobalt material, or a neodymium-iron-boron material. In the present embodiment, magnet 5 is formed of a samarium-cobalt material with high Curie temperature and with high corrosion resistance.

Magnet 5 is connected to dielectric component 3 on the opposite side to magnetic plate 1, that is, the upper side in FIG. 3 through sheet adhesive 13. More specifically, magnet 5 is disposed so as to be partially stored in cavity 3C of dielectric component 3. That is, at least a part of magnet 5 is disposed in cavity 3C. The other main surface 5B of magnet 5 is connected to bottom surface 3C1 in cavity 3C through sheet adhesive 13. At least a part of the side surface of magnet 5 is connected to side surface 3C2 in cavity 3C through sheet adhesive 13. Thus, the surface of at least a part of magnet 5 disposed in cavity 3C is fixed to both of bottom surface 3C1 and side surface 3C2 of cavity 3C through an adhesive, that is, sheet adhesive 13. Magnet 5 is therefore fitted in cavity 3C through sheet adhesive 13.

As described above, the height of the side portion of cavity 3C is preferably equal to or greater than 0.1 mm, and the dimension in the height direction of magnet 5 is, for example, 1.0 mm. Thus, the height dimension of the side portion of cavity 3C is preferably equal to or greater than 10% of the dimension in the height direction of magnet 5, and the height dimension of the side portion of cavity 3C may be equal to the dimension in the height direction of magnet 5. That is, it is preferable that the height dimension of the side portion of cavity 3C is 10% to 100% of the dimension in the height direction of magnet 5.

Magnet 5 is a member that can apply a bias magnetic field to control transmission of an electrical signal from each of a plurality of signal conductors on circuit board 11 disposed below, which will be described later, to the corresponding one of three input/output terminals 31 of magnetic plate 1. Specifically, for example, a signal input from a first signal conductor of three signal conductors to a first input/output terminal 31 of three input/output terminals 31 is transmitted with almost no attenuation to a second input/output terminal 31 that is another input/output terminal 31 and then output to a second signal conductor. On the other hand, a signal considerably attenuated is transmitted to a third input/output terminal 31 that is another input/output terminal 31 different from the above, and the signal considerably attenuated is output to a third signal conductor. With such operation, magnet 5 has the function of applying a magnetic field only in one direction in the inside of magnetic plate 1 and rotating the transmission path of microwave input from an input/output terminal to an input/output terminal 31 in a certain direction.

As shown in FIG. 1 and FIG. 3, dielectric component 3 is connected to magnetic plate 1, for example, by sheet adhesive 13 on the inside of a plurality of through holes 25 in a two-dimensional view. Specifically, consider a circle passing through three through holes 25, which is a curve that smoothly connects a plurality of (three in FIG. 2) through holes 25 in a two-dimensional view. In this case, dielectric component 3 is disposed at a position fitted in the inside of the circle passing through three through holes 25. Similarly, magnet 5 is also disposed on the inside of a plurality of through holes 25 in a two-dimensional view. With this configuration, a bias magnetic field can be uniformly applied to the entire center electrode 21. In the present embodiment, the center of the circle of magnet 5 and the center of the circle of center electrode 21 in a two-dimensional view are disposed substantially at the same position. However, the present invention is not limited to such a manner, and the center of the circle of magnet and the center of the circle of center electrode 21 in a two-dimensional view may be displaced from each other depending on the performance of nonreciprocal circuit element 100.

Magnetic yoke 7 is connected to magnet 5 on the opposite side to magnetic plate 1, that is, the upper side in FIG. 3 through sheet adhesive 13. Magnetic yoke 7 is a member having the function of controlling a path of magnetic line of force and achieving the electromagnetic shield effect as well as the effect of suppressing the magnetic effect in surface mounting using a chip mounter. Similar to other members, magnetic yoke 7 also has one main surface 7A (the upper side in FIG. 3) and the other main surface 7B (the lower side in FIG. 3) on the opposite side. In the present embodiment, it is preferable that magnetic yoke 7 is basically formed of a ferromagnetic material. For example, a member formed of SUS430 in the shape of a disc is used. Magnetic yoke 7 in the present embodiment, for example, has a diameter of 4.0 mm and a thickness of 0.2 mm. The shape of magnetic yoke 7 is not limited to a disc shape described above and may be; for example, polygonal in a two-dimensional view. Magnetic yoke 7 is not necessarily connected to magnet 5 and may be shaped, for example, like a cap that covers one main surface 5A of magnet 5.

Sheet adhesive 13 serving as an adhesive that bonds magnetic plate 1, dielectric 2h component 3, magnet 5, and magnetic yoke 7 such that they are integrated with each other is a flat plate-shaped member. Sheet adhesive 13 is joined to one or the other main surface of magnetic plate 1, dielectric component 3, magnet 5, and magnetic yoke 7 to bond these members together. That is, sheet adhesive 13 bonds one main surface 1A of magnetic plate 1 (center electrode 21) with the other main surface 3B of dielectric component 3 immediately above to bond magnetic plate 1 and dielectric component 3 together. Here, one main surface 13A of sheet adhesive 13 is bonded to the other main surface 3B of dielectric component 3, and the other main surface 13B of sheet adhesive 13 is bonded to one main surface 1A of magnetic plate 1 (center electrode 21).

Sheet adhesive 13 also bonds to one main surface 3A of dielectric component 3 (bottom surface 3C1 of cavity 3C) and the other main surface 5B of magnet 5 immediately above to bond dielectric component 3 and magnet 5 together. Here, one main surface 13A of sheet adhesive 13 is bonded to the other main surface 5B of magnet 5, and the other main surface 13B of sheet adhesive 13 is bonded to one main surface 3A of dielectric component 3 (bottom surface 3C1 and side surface 3C2 of cavity 3C). In addition, sheet adhesive 13 bonds to one main surface 5A of magnet 5 and the other main surface 7B of magnetic yoke 7 immediately above to bond magnet 5 and magnetic yoke 7 together. Here, one main surface 13A of sheet adhesive 13 is bonded to the other main surface 7B of magnetic yoke 7, and the other main surface 13B of sheet adhesive 13 is bonded to one main surface 5A of magnet 5.

A thermosetting adhesive or a thermoplastic adhesive is preferably used as sheet adhesive 13. Considering the wettability on a bonded target and the difference in thermal expansion coefficient, different product numbers may be used as a plurality of sheet adhesives 13. However, in the present embodiment, an epoxy resin-based adhesive having the same thermosetting property is used for all sheet adhesives 13.

In terms of ensuring good adhesiveness of sheet adhesive 13 in the assembly process to connect the members, sheet adhesive 13 is preferably formed of a thermoplastic resin mainly composed of a tackiness agent. However, a thermoplastic resin lacks heat resistance when used for surface mounting. Then, in the present embodiment, in terms of ensuring both good adhesiveness and heat resistance, it is preferable that sheet adhesive 13 formed of a material containing both a thermoplastic resin and a thermosetting resin is used.

For the shape and the dimensions of sheet adhesive 13, it is required that magnet 5 can be adhesively fixed to bottom surface 3C1 and side surface 3C2, which are inner wall surfaces of cavity 3C, through sheet adhesive 13 when at least a part of magnet 5 is disposed and fixed so as to be stored in cavity 3C of dielectric component 3. In this respect, in the present embodiment, for example, sheet adhesive 13 at each part described above has the same shape, that is, a circular two-dimensional shape, and its dimensions in a two-dimensional view are 3.6 mm in diameter and 0.1 mm in thickness.

Since the thickness of sheet adhesive 13 affects dielectric loss, the thickness above is set considering the thickness of dielectric component 3. Any insulating material that can adhesively fix the members and ensure electrical insulation between the members adhesively fixed can be used as sheet adhesive 13. For example, one-component adhesive or two-component adhesive may be used as sheet adhesive 13.

A plurality of solder bumps 9 are connected to the lowermost portion of magnetic plate 1, dielectric component 3, magnet 5, and magnetic yoke 7 integrated by sheet adhesive 13 in FIG. 3, that is, on the other main surface 1B of magnetic plate 1. Solder bumps 9 are used for electrically connecting element body 100A with mounting board 1009. As shown in FIG. 5, solder bumps 9 are joined to the pad electrode portions where input/output terminals 31 and ground electrode 33 are exposed from solder resist 35, on the other main surface 1B side (on the other main surface 1B) of magnetic plate 1. The terminals and the electrodes of magnetic plate 1 are thus electrically connected to solder bumps 9.

Solder bumps 9 are preferably formed of, for example, solder of an alloy of tin, silver, and copper, preferably formed of, for example, Sn3.0Ag0.5Cu, although the present invention is not limited thereto. Solder bump 9 is shaped, for example, like a ball and its dimensions are an important factor to determine the gap between magnetic plate 1 and circuit board 11. It is therefore preferable that solder bump 9 has, for example, a diameter of 0.65 mm considering the electrical characteristics between magnetic plate 1 and circuit board 11, the connection reliability, and the work efficiency in installing solder bumps 9 on circuit board 11, although the present invention is not limited thereto.

Circuit board 11 serving as mounting board 100B is, for example, a flat plate member having a rectangular shape in a two-dimensional view and has one main surface 11A (the upper side in FIG. 3) and the other main surface 11B (the lower side in FIG. 3) on the opposite side, similar to the other members. Circuit board 11 is preferably formed of a ceramic material or a resin material. In the present embodiment, however, a print board made of a resin with dielectric loss lower than a ceramic material is used as circuit board 11. This can achieve both improvement in high frequency characteristics of circuit board 11 and reduction in production costs. The outer shape of circuit board 11 is, for example, a square of 50 mm by 50 mm in a two-dimensional view, and the thickness, that is, the distance between one main surface 11A and the other main surface 111B is 1.7 mm.

On circuit board 11, pad electrodes 41 as a plurality of signal conductors and circuit board center electrodes 43 are formed. That is, pad electrodes 41 as a plurality of signal conductors and circuit board center electrodes 43 are formed on one main surface 11A of circuit board 11. Among those, although not shown, pad electrodes 41 are provided at in total three positions 120° apart from each other with respect to the circumferential direction of a virtual circle drawn on one main surface 11A around the center thereof in a two-dimensional view of one main surface 11A. In other words, three pad electrodes 41 are disposed in a direction two-dimensionally overlapping with interconnects 23 of magnetic plate 1. A plurality of circuit board center electrodes 43 are provided at a distance from each other at some positions two-dimensionally overlapping with ground electrode 33 of magnetic plate 1.

On one main surface 11A, solder resist 35 is formed so as to cover the surfaces of pad electrodes 41 and circuit board center electrodes 43 in the same manner as on the other main surface 13 of magnetic plate 1. However, pad electrodes 41 and circuit board center electrodes 43 are exposed from solder resist 35 since solder resist 35 has openings at portions that overlap pad electrodes 41 and circuit board center electrodes 43.

The exposed pad electrodes 41 and circuit board center electrodes 43 are joined to solder bumps 9. Magnetic plate 1 is thus electrically connected to circuit board 11. Specifically, pad electrodes 41 of circuit board 11 are electrically connected with a plurality of input/output terminals 31 and ground electrode 33 of magnetic plate 1. Here, pad electrodes 41 are electrically connected with a plurality of input/output terminals 31 and ground electrode 33 through solder bumps 9 or sheet adhesive 13. However, any other connection means may be used. The connection between element body 100A and mounting board 100B using solder bumps 9 in this manner is called BGA (Ball Grid Array). Since the difference in thermal expansion coefficient between magnetic plate 1 and circuit board 11 connected to each other is large, the use of BGA can reduce thermal stress between magnetic plate 1 and circuit board 11.

On the surfaces of pad electrodes 41 and circuit board center electrodes 43 in the openings of solder resist 35, a stack of a nickel plating film having a thickness of 3 μm to 5 μm and a gold plating film having a thickness of 0.02 μm to 0.05 μm is formed. The plating films are to improve oxidation resistance of pad electrodes 41 and the like and the wettability of solder bumps 9 thereon. Such nickel and gold plating films may be formed also on the surfaces of input/output terminals 31 and ground electrode 33 of magnetic plate 1.

In addition, on the other main surface 5B of circuit board 11, for example, a back-surface electrode 51 is formed so as to cover the entire surface. Circuit board 11 has a through hole 53 extending from circuit board center electrode 43 on one main surface 5A to back-surface electrode 51 on the other main surface 5B, and a conductive film 55 is formed to fill through hole 53.

Pad electrodes 41, circuit board center electrodes 43, and back-surface electrode 51 formed on circuit board 11 are preferably formed of, for example, a copper foil having a thickness of 40 μm to 70 μm. Conductive film 55 may also be formed of the same copper foil as circuit board center electrode 43.

As described above, element body 100A is mounted on one main surface 5A of circuit board 11 as mounting board 100B using solder bumps 9 to form nonreciprocal circuit element 100. To put it another way, circuit board 11 is connected on the other main surface 1B of magnetic plate 1 (the other main surface 1B side) through solder bumps 9.

Referring now to FIG. 6 to FIG. 17, a method of manufacturing nonreciprocal circuit element 100 in the present embodiment will be described.

Figure 6:
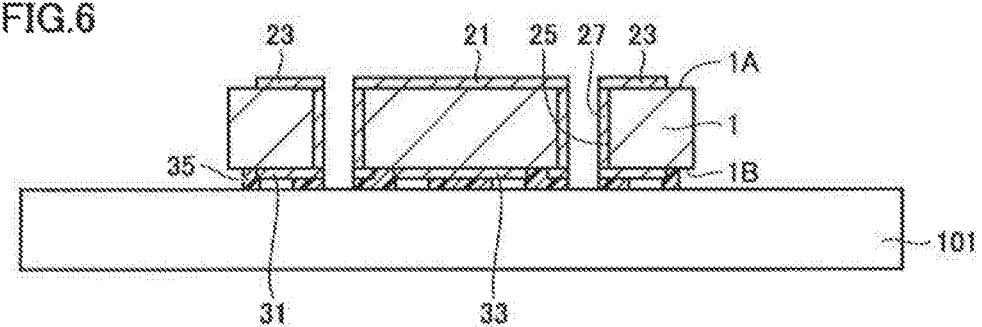
FIG. 6 is a schematic cross-sectional view showing a first step of a method of manufacturing a nonreciprocal circuit element in the first embodiment.

Referring to FIG. 6, magnetic plate 1 having one main surface 1A and the other main surface 1B on the opposite side is prepared. In this magnetic plate 1, through holes 25 extending from one main surface 1A to the other main surface 1B are formed. For example, common known sand blasting or laser processing is used in forming through holes 25. In the present embodiment, sandblasting is preferably used in terms of reducing the processing cost.

Center electrode 21 and interconnects 23 are formed on one main surface 1A, and a plurality of input/output terminals 31 and ground electrode 33 are formed on the other main surface 1B. These are preferably formed by a method selected from common known screen printing, sputtering, vapor deposition, and plating. In the present embodiment, for example, first of all, a copper thin film of 3 μm to 5 μm is formed by electroplating on one main surface 1A and the other main surface 1B of a base material of magnetic plate 1, and on a surface of the copper thin film, a stack of a nickel plating film having a thickness of 1 μm to 2 μm and a gold plating film having a thickness of 0.02 μm to 0.05 μm is formed. The nickel and gold plating films are formed in order to prevent oxidation of the copper thin film and improve the wettability of solder. These films may be formed to form conductive film 27 on the inner wall surface of through hole 25.

The formed films are patterned, for example, by common known photolithography technique. Subsequently, solder resist 35 is formed on the other main surface 1B so as to cover input/output terminals 31 and ground electrode 33. However, solder resist 35 in a region where input/output terminals 31 and ground electrode 33 are to be exposed is formed such that openings are formed. It is preferable that solder resist 35 is formed by sputtering or vapor deposition when a metal material less wetted with solder, such as chromium, is formed, and solder resist 35 is formed by screen printing when an epoxy resin-based material is formed. In the present embodiment, epoxy resin-based solder resist 35 is formed by screen printing.

The thus formed magnetic plate 1 is placed on one main surface of a hotplate 101. For example, magnetic plate 1 is placed on hotplate 101 such that solder resist 35 on the other main surface 1B side is in contact with hotplate 101.

Figure 7:
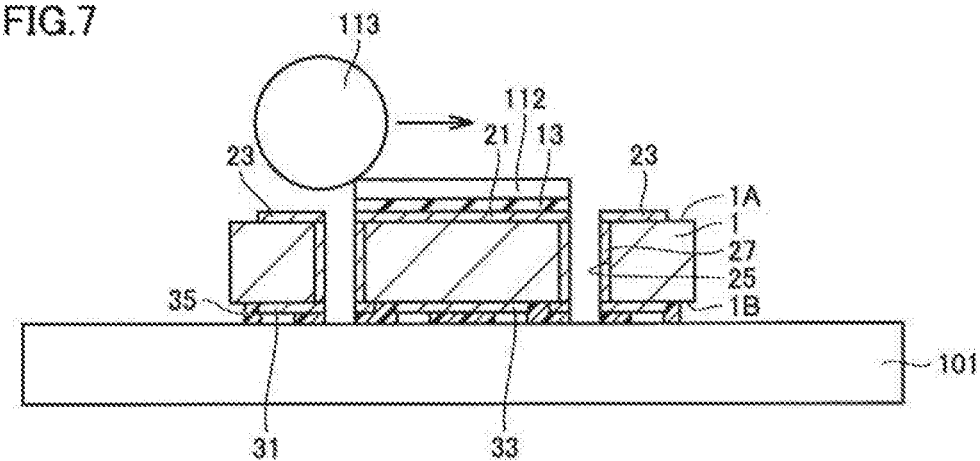
FIG. 7 is a schematic cross-sectional view showing a second step of the method of manufacturing a nonreciprocal circuit element in the first embodiment.

Referring to FIG. 7, magnetic plate 1 placed on hotplate 101 is heated and, after magnetic plate 1 becomes stable with high surface temperature, sheet adhesive 13 is affixed on, for example, center electrode 21 of magnetic plate 1. Sheet adhesive 13 is supplied in the shape of a roll by a material manufacturer and shaped into individual pieces using a mold.

The tackiness, which is initial adhesiveness of adhesive, of common sheet adhesive 13 depends on its temperature. Sheet adhesive 13 thus has both the easiness of handling and adhesiveness. Specifically, sheet adhesive 13 in the present embodiment has low tackiness and is easy to handle at room temperature. However, sheet adhesive 13 under room temperature has flexibility not enough to be bonded on magnetic plate 1 without wrinkling. Then, to affix sheet adhesive 13 on magnetic plate 1, it is preferable that sheet adhesive 13 is softened by heating to 40° C. to 80° C. This processing can improve the wettability of sheet adhesive 13 on the bonded target and achieves high adhesion.

In terms of bonding sheet adhesive 13 on magnetic plate 1 without wrinkling, it is preferable that a rubber roller 113 is used to press sheet adhesive 13 on magnetic plate 1. By doing so, the pressing force by roller 103 further improves the wettability of sheet adhesive 13 on magnetic plate 1 and suppresses intrusion of bubbles into a region between sheet adhesive 13 and magnetic plate 1 (center electrode 21). In the present embodiment, it is preferable that roller 103 made of silicone rubber with a hardness of 60 is used to apply a pressure of 0.3 MPa to 1.0 MPa and is rotationally moved at a speed of 10 mm/s to 100 mm's along the right-left direction in the figure.

In terms of eliminating such inconvenience that roller 113 adheres to sheet adhesive 13 when roller 113 is rolled on sheet adhesive 13, it is preferable that a release film 112 is affixed to sheet adhesive 13. That is, sheet adhesive 13 is affixed in intimate contact with center electrode 21, and release film 112 integrated with sheet adhesive 13 is disposed on the upper side of sheet adhesive 13 in FIG. 7. Since roller 113 rolls on sheet adhesive 13 in contact with release film 112 to press it and therefore does not come into intimate contact with sheet adhesive 13 by pressing.

It is more preferable to use roller 113 with a heater because if so, the temperature difference between an upper region and a lower region of sheet adhesive 13 in FIG. 7 can be reduced.

Although not shown, after pressure bonding of sheet adhesive 13 onto magnetic plate 1 by roller 113 described above is finished, release film 112 is peeled off to expose sheet adhesive 13, and magnetic plate 1 is removed from hotplate 101 and stored.

Figure 8:
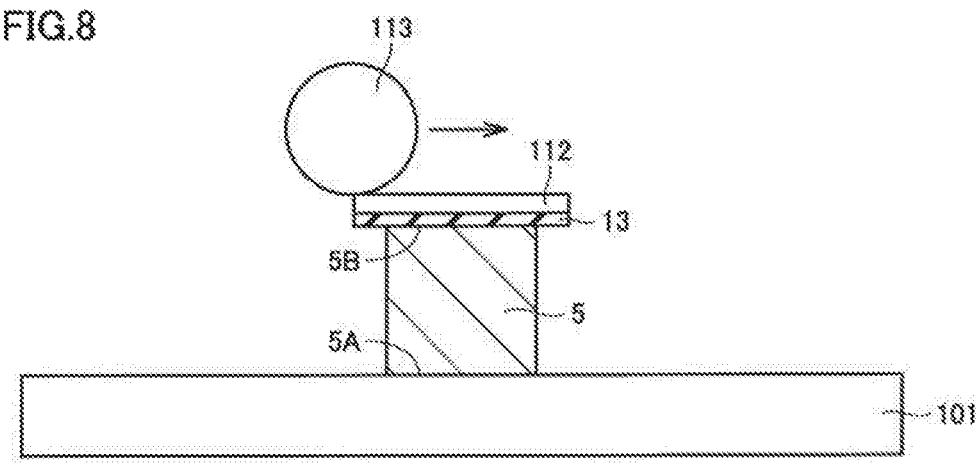
FIG. 8 is a schematic cross-sectional view showing a third step of the method of manufacturing a nonreciprocal circuit element in the first embodiment.
Figure 9:
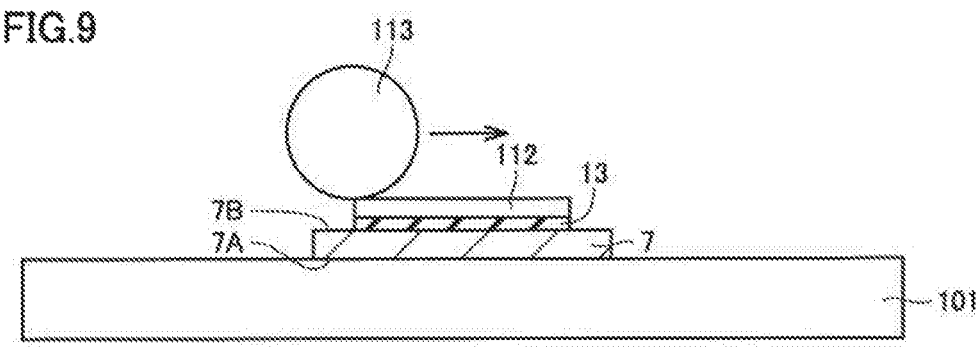
FIG. 9 is a schematic cross-sectional view showing a fourth step of the method of manufacturing a nonreciprocal circuit element in the first embodiment.
Figure 10:
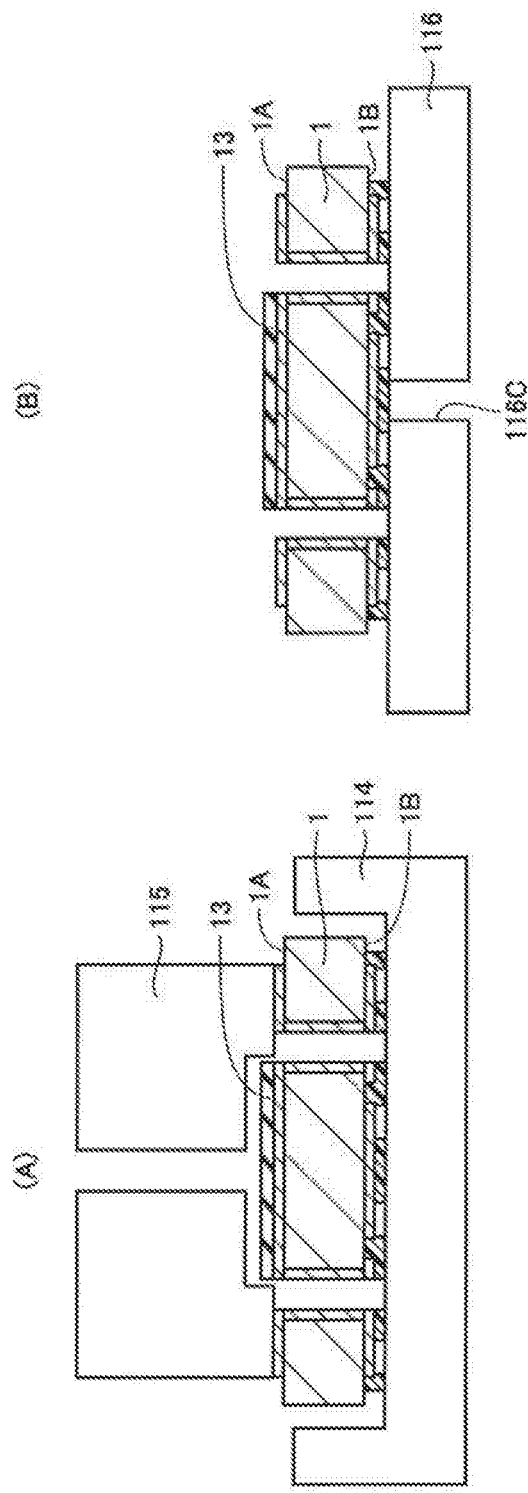
FIG. 10 is a schematic cross-sectional view showing a fifth step of the method of manufacturing a nonreciprocal circuit element in the first embodiment.
Figure 11:
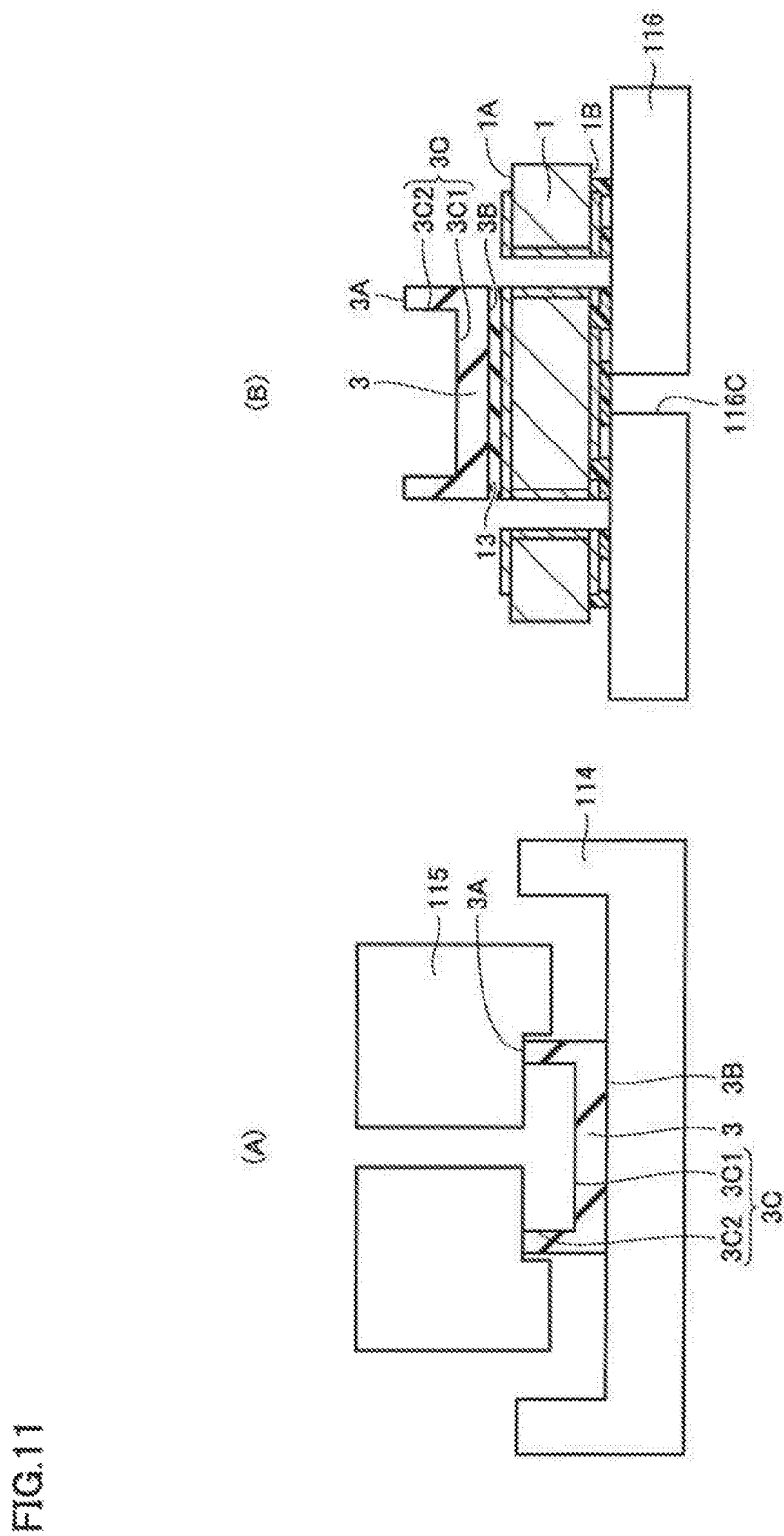
FIG. 11 is a schematic cross-sectional view showing a sixth step of the method of manufacturing a nonreciprocal circuit element in the first embodiment.

Referring now to FIG. 8, magnet 5 is placed on hotplate 101. Here, magnet 5 is placed on hotplate 101 such that one main surface 5A disposed on the upper side in the finished nonreciprocal circuit element 100 is disposed on the lower side in contact with hotplate 101. After magnet 5 is heated in the same manner as in FIG. 7, sheet adhesive 13 is affixed on the other main surface 5B and pressed by roller 113 with the attached release film 112 interposed. Here, the process above may be performed in a state in which magnet 5 is fixed on a support plate such as a ferromagnetic material in order to prevent magnet 5 from moving due the effect of magnetic force. Although not shown, after the pressing step is finished, release film 112 is peeled off, and magnet 5 is removed from hotplate 101 and stored, Referring now to FIG. 9, magnetic yoke 7 is placed on hotplate 101. Here, one main surface 7A is disposed on the lower side in contact with hotplate 101 in the same manner as in FIG. 8. Then, the procedure using roller 113 similar to those in FIGS. 7 and 6 is performed to affix sheet adhesive 13 on the other main surface 7B, In the following FIG. 10 to FIG. 13, (A) shows the step of installing a member in a special tray 114 and (B) shows the step of building the member on an assembly stage 116. Referring to FIG. 10 to FIG. 13, magnetic plate 1, dielectric component 3, magnet 5, and magnetic yoke 7 are assembled using a chip mounter having special tray 114, suction nozzle 115, and assembly stage 116. As shown in FIG. 10(A), magnetic plate 1 is stored in special tray 114. The other members are stored similarly, specifically, dielectric component 3 illustrated in FIG. 11(A), magnet 5 illustrated in FIG. 12(A), and magnetic yoke 7 illustrated in FIG. 13(A) are each stored in special tray 114. Here, one main surface 1A, 3A. 5A, 7A disposed on the upper side in the finished nonreciprocal circuit element 100 is disposed to face up.

Thus, in magnet 5 and magnetic yoke 7, sheet adhesive 13 is placed in contact with special tray 114.

If sheet adhesive 13 affixed to magnet 5 and magnetic yoke 7 adheres to special tray 114, it becomes difficult to pick up the components such as magnet 5. In terms of suppressing such inconvenience, it is preferable to provide a relief groove structure at a place in contact with sheet adhesive 13 in special nay 114 or to perform surface treatment to suppress adhesion to sheet adhesive 13. As the surface treatment, for example, the process of physically roughing the surface such as sandblasting may be performed. Alternatively, as the surface treatment, a material that provides a release action such as polytetrafluoroethylene (PTFE) may be used for the surface. As for magnet 5 in FIG. 12(A), in terms of preventing a plurality of magnets 5 stored in special tray 114 from applying magnetic force to each other due to the effect of magnetic force, it is preferable to use special tray 114 with a sufficient pitch kept between the components.

Next, for example, magnetic plate 1 is sucked up by suction nozzle 115 included in the chip mounter from special tray 114 as illustrated in FIG. 10(A) and placed on assembly stage 116 as illustrated in FIG. 10(B). Assembly stage 116 has a flat plate shape and has a vacuum suction portion 116C in the form of a through hole extending from one (upper side) of the main surfaces to the other (lower side) main surface. That is, assembly stage 116 has a configuration such that an object placed immediately above can be sucked to assembly stage 116 by the suction force from below vacuum suction portion 116O. Magnetic plate 1 placed on assembly stage 116 is thus sucked by vacuum suction portion 116C immediately below and thereby fixed on assembly stage 116.

Next, dielectric component 3 is sucked up from special tray 114 by suction nozzle 115 as illustrated in FIG. 11(A) and installed on the center portion of sheet adhesive 13 of magnetic plate 1 fixed to assembly stage 116 as illustrated in FIG. 11(B). Dielectric component 3 is thus connected on one main surface 1A of magnetic plate 1, As described above, dielectric component 3 has cavity 3C having bottom surface 3C1 and side surface 3C2 in a part of one main surface 3A that is a surface on the side (upper side) to which magnet 5 described later is connected. Dielectric component 3 is installed and connected to magnetic plate 1 such that the other main surface 3B on the lower side of dielectric component 3 is in contact with sheet adhesive 13 of magnetic plate 1.

Here, in order to improve the wettability between dielectric component 3 and sheet adhesive 13, it is preferable that the level to which suction nozzle 115 is lowered is set to an appropriate numerical value, for example, such that the downward pressing force when dielectric component 3 is bonded to sheet adhesive 13 is controlled to 0.3 MPa to 1.0 MPa. In FIG. 11(B), it is preferable that a stop time of 1 to 10 seconds is provided at the moment when suction nozzle 115 reaches the lowest point to which it can be lowered, that is, when dielectric component 3 reaches the lowest point, that is, on sheet adhesive 13 of magnetic plate 1. This stop time is a waiting time sufficient for temporarily fixing sheet adhesive 13 and dielectric component 3.

Figure 12:
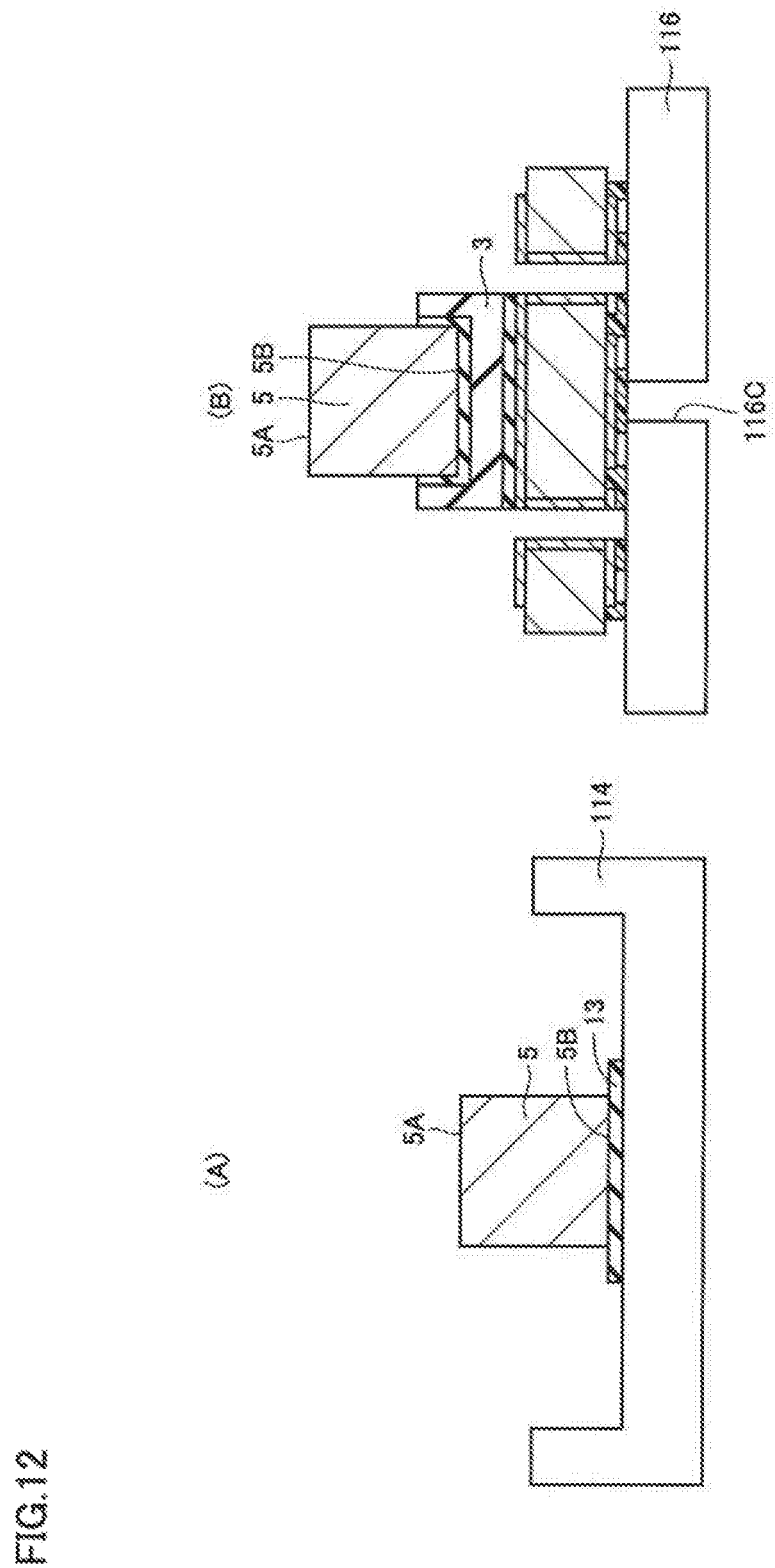
FIG. 12 is a schematic cross-sectional view showing a seventh step of the method of manufacturing a nonreciprocal circuit element in the first embodiment.
Figure 13:
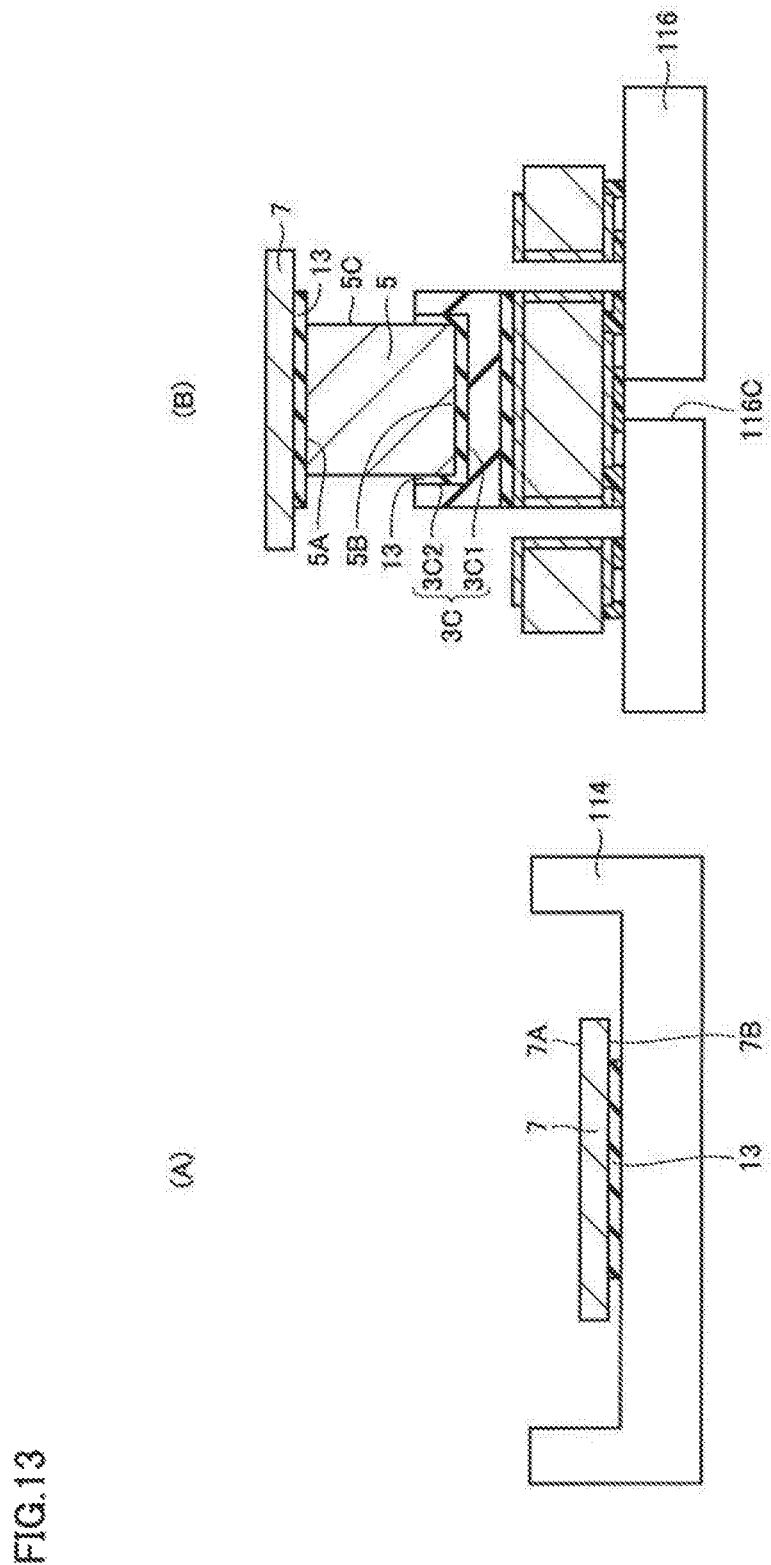
FIG. 13 is a schematic cross-sectional view showing an eighth step of the method of manufacturing a nonreciprocal circuit element in the first embodiment.

Next, magnet 5 and sheet adhesive 13 are sucked up from special tray 114 illustrated in FIG. 12(A) and disposed to be stored in cavil 3C of dielectric component 3 connected to magnetic plate 1 on assembly stage 116 as illustrated in FIG. 12(B). Here, sheet adhesive 13 bonded to the other main surface 5B of magnet 5 is bonded to bottom surface 3C1 of cavity 3C, whereby dielectric component 3 is connected to bottom surface 3C1, Magnet 5 is thus connected to dielectric component 3 on the opposite side to magnetic plate 1, that is, the upper side in FIG. 12. Although not shown, in this step, magnet 5 is sucked up from special tray 114 by suction nozzle 115 similar to those in FIG. 10 and FIG. 11 and stored into cavity 3C of dielectric component 3.

More specifically, in the step in FIG. 12(B), in a state in which at least a part of magnet 5 is disposed in cavity 3C, the surface of at least a part of magnet 5 disposed in cavity 3C is fixed to both of bottom surface 3C1 and side surface 3C2 through sheet adhesive 13. As used herein at least a part of magnet 5 means a region relatively closer to the other main surface 5B of magnet 5, for example, in FIG. 12(A). In other words, this sheet adhesive 13 is bonded to the other main surface 5B of magnet 5 and a relatively lower region of magnet side surface 5C, while bonding to both of bottom surface 3C1 and side surface 3C2 which are inner wall surfaces of cavity 3C. Sheet adhesive 13 thus connects magnet 5 and dielectric component 3 (cavity 3C).

In the step in FIG. 12(B), it is preferable to prevent sheet adhesive 13 to be affixed to the other main surface 5B of magnet 5 from being caught on the inner wall surface of cavity 3C of dielectric component 3 and sheet adhesive 13 from being damaged. In this respect, the lowering speed of not-shown suction nozzle 115 that conveys magnet 5 to the dielectric component 3 side for storing magnet 5 into cavity 3C need to be sufficiently slow, specifically preferably 0.1 mm/s to 1 mm/s.

The lowering speed above can suppress damage to sheet adhesive 13 but reduces the productivity since it takes long time to install magnet 5. In terms of preventing reduction in productivity, therefore, it is preferable to use two-level control mode depending on the arrangement position in height direction of suction nozzle 115 in the chip mounter. That is, it is preferable that the speed is switched such that when magnet 5 is located in an upper region relatively away from dielectric component 3, this is moved downward at a high speed of, for example, 100 mm/s, whereas in the operation in which magnet 5 is inserted into dielectric component 3, this is operated at a low speed.

Next, magnetic yoke 7 and sheet adhesive 13 are sucked up from the special tray illustrated in FIG. 13(A) in the same manner as in the step in FIG. 12, and they are placed onto one main surface 5A of magnet 5 on assembly stage 116 as illustrated in FIG. 13(B). In other words, magnetic yoke 7 is connected to magnet 5 on the opposite side to magnetic plate 1, that is, on the upper side in FIG. 12, through sheet adhesive 13. The detailed procedure in this step is basically the same as the step in FIG. 12. The step of connecting magnetic yoke 7 is performed while the surface of at least a part of magnet 5 is kept fixed to both of bottom surface 3C1 and side surface 3C2 of cavity 3C through sheet adhesive 13. That is, magnetic yoke 7 is connected on one main surface 5A of magnet 5 in a state in which the other main surface 5B of magnet 5 is kept fixed to bottom surface 3C1 of cavity 3C and at least a part of magnet side surface 5C of magnet 5 is kept fixed to side surface 3C2 through sheet adhesive 13.

The order in which the components above are assembled is not limited to the order described above. For example, magnet 5 and dielectric component 3 may be assembled first and then connected on magnetic plate 1, and thereafter magnetic yoke 7 may be connected on one main surface 5A of magnet 5.

Figure 14:
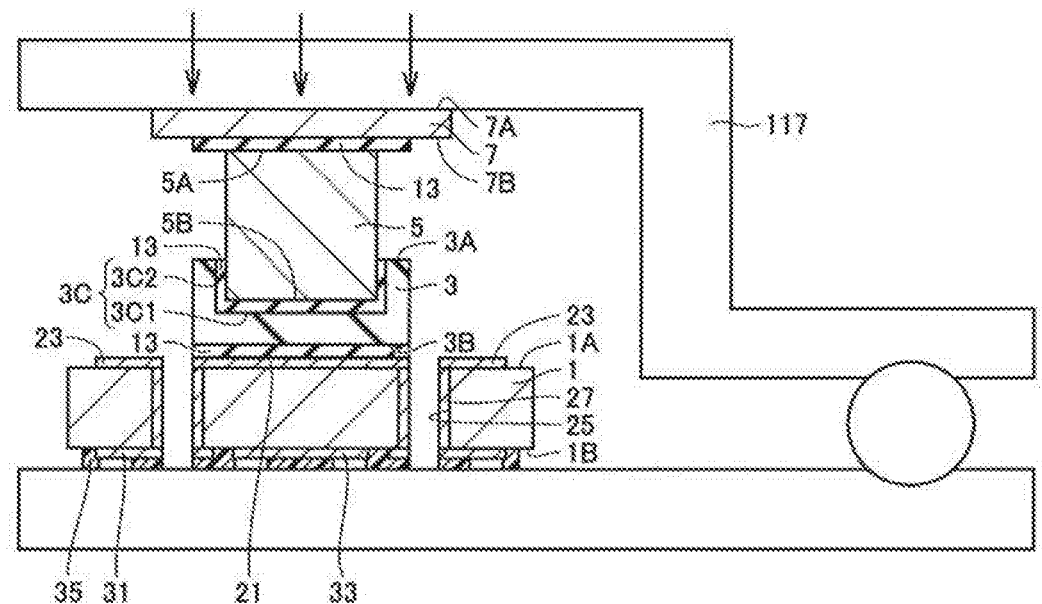
FIG. 14 is a schematic cross-sectional view showing a ninth step of the method of manufacturing a nonreciprocal circuit element in the first embodiment.

Referring to FIG. 14, after magnetic plate 1, dielectric component 3, magnet 5, and magnetic yoke 7 are integrated through the step in FIG. 13, for example, a pressure clip 117 may be used to apply a downward pressure onto one main surface 7A of magnetic yoke 7 as indicated by the arrows in the figure. This pressure is preferably 0.3 MPa to 3.0 MPa. With such a pressure applied, the entire system illustrated in FIG. 14 is put into an oven and heated, for example, at 200° C. for 15 minutes. This hardens sheet adhesive 13.

Figure 15:
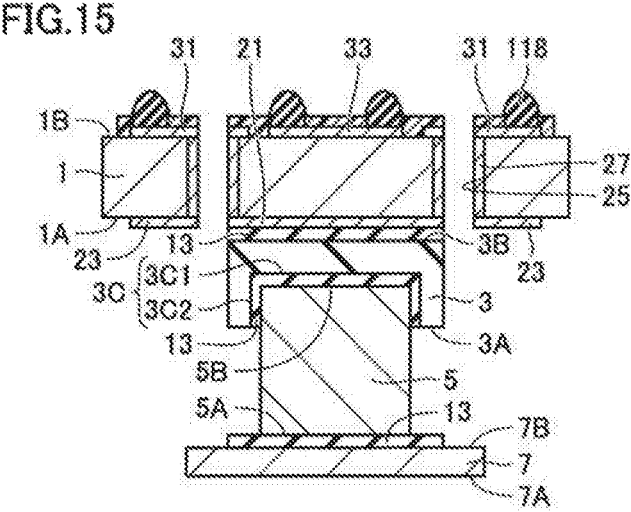
FIG. 15 is a schematic cross-sectional view showing a tenth step of the method of manufacturing a nonreciprocal circuit element in the first embodiment.
Figure 16:
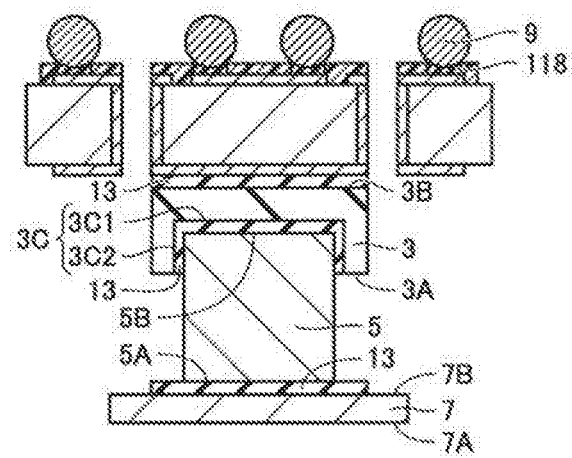
FIG. 16 is a schematic cross-sectional view showing an eleventh step of the method of manufacturing a nonreciprocal circuit element in the first embodiment.

In the following FIG. 15 and FIG. 16, magnetic plate 1, dielectric component 3, magnet 5, magnetic yoke 7, and sheet adhesive 13 are turned upside down. Referring to FIG. 15 and FIG. 16, next, solder bumps 9 are connected on the other main surface 1B of magnetic plate 1. Specifically, referring to FIG. 15, for example, with magnetic plate 1 turned upside down, flux 118 is supplied on the other main surface 1B of magnetic plate 1, specifically, on the surfaces of input/output terminals 31 and ground electrode 33 (pad electrodes) exposed from solder resist 35 in the openings of solder resist 35.

It is preferable that flux 118 is supplied by common known screen printing using a print mask with a metal thin film. Inert rosin-based non-clean flux is preferably used as flux 118. While flux 118 supplied to the print mask is spread, for example, with a urethane squeeze, flux 118 is supplied onto the surfaces of input/output terminals 31 and ground electrode 33 (pad electrodes).

Referring to FIG. 16, solder bumps 9 are placed on flux 118 supplied on the pad electrodes in the step in FIG. 15. Solder bumps 9 are installed, for example, by conveying solder bumps 9 sucked with a mounter onto flux 118. Alternatively, part of solder bumps 9 set on a mask with a metal thin film and spread beyond the mask may be scraped off by a urethane squeeze, whereby solder bumps 9 are supplied to the openings of solder resist 35 on the other main surface 1B of magnetic plate 1, In the latter case, the operation can be performed easily using a simple tool.

Subsequently, by heating in a reflow furnace and soldering, solder bumps 9 are connected to input/output terminals 31 and ground electrode 33 in the openings of solder resist 35 on the other main surface 1B. Element body 100A is thus formed.

Figure 17:
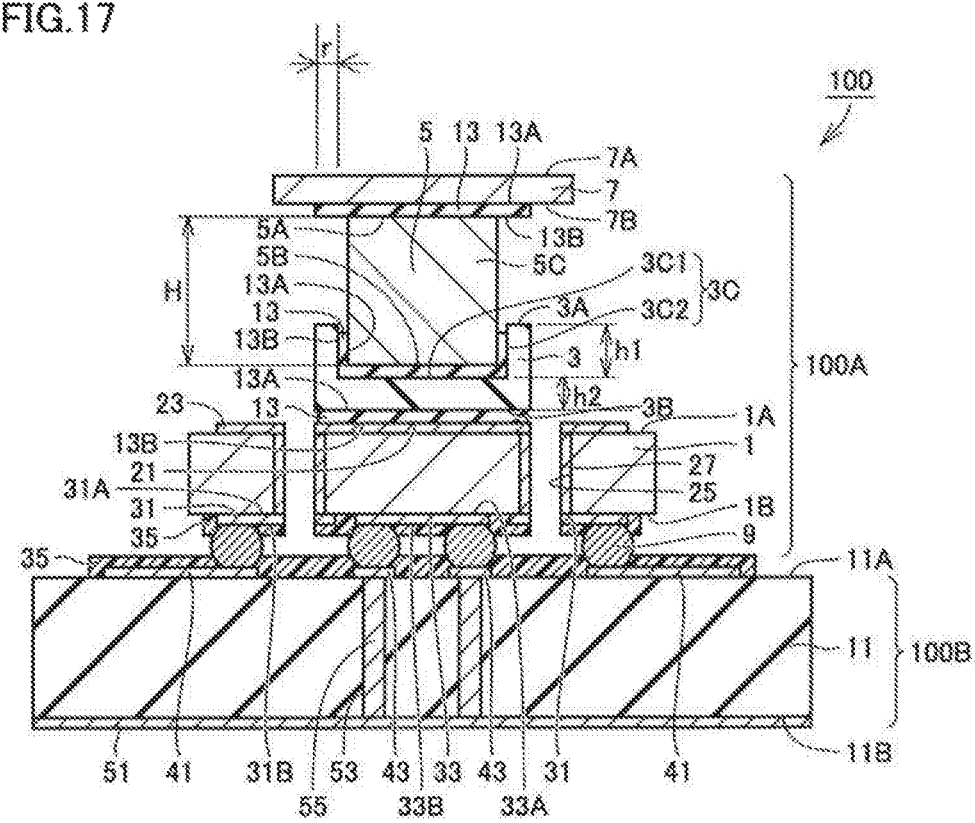
FIG. 17 is a schematic cross-sectional view showing a twelfth step of the method of manufacturing a nonreciprocal circuit element in the first embodiment.

Referring to FIG. 17, circuit board 11 is prepared as mounting board 100B for mounting element body 100A described above. In circuit board 11, pad electrodes 41 and circuit board center electrodes 43 are formed on one main surface 11A, back-surface electrode 51 is formed on the other main surface 11B, and through holes 53 and conductive films 55 are formed in the substrate. A pattern of solder resist 35 is formed on one main surface 11A of circuit board 11 by common known screen printing in the same manner as solder resist 35 and flux 118 formed on the other main surface 1B described above. This solder resist 35 is formed to have openings at portions connected with solder bumps 9 such that pad electrodes 41 and circuit board center electrodes 43 are exposed. On the surface of the exposed pad electrodes 41 and circuit board center electrodes 43, a solder paste thin film is formed by printing although not shown.

Element body 100A formed in FIG. 16 as a whole is turned upside down again and placed such that solder bumps 9 connected to magnetic plate 1 are in contact with the region where solder resist 35 has openings to expose pad electrodes 41 and circuit board center electrodes 43. By heating in a reflow furnace and soldering in this state, solder bumps 9 are connected to pad electrodes 41 and circuit board center electrodes 43 of circuit board 11, Element body 100A is thus connected, that is, mounted on mounting board 100B.

Through the steps in FIG. 15 to FIG. 17 above, circuit board 11 having pad electrodes 41 as a plurality of signal conductors is connected on the other main surface 1B side of magnetic plate 1 with solder bumps 9 interposed.

Referring to FIG. 17 again, as described above, height dimension h1 of the side portion of cavity 3C is preferably 10% or more of dimension H in the height direction of magnet 5, and height dimension h1 of the side portion of cavity 3C may be equal to dimension H in the height direction of magnet 5. In other words, height dimension h1 of the side portion of cavity 3C is preferably 10% to 100% of dimension H in the height direction of magnet 5, In the present embodiment, h1 is 0.3 mm and H is 1.0 mm. Height dimension h1 of the side portion is preferably equal to or less than twice thickness r of the side portion from side surface 3C2 of cavity 3C to the side surface (surface) of the outermost portion of dielectric component 3. In the present embodiment, r is 0.3 mm. Thickness h2 of the bottom portion from bottom surface 3C1 to the other main surface 3B of cavity 3C is preferably, for example, 0.2 mm to 0.5 mm. In the present embodiment, h2 is 0.3 mm.

Through the steps above, nonreciprocal circuit element 100 in the manner shown in FIG. 3 can be formed.

The operation effect of the present embodiment will now be described.

In the method of manufacturing nonreciprocal circuit element 100 in the present embodiment, in a state in which at least a part of magnet 5 is placed in cavity 3C formed in the upper surface of dielectric component 3, the other main surface 5B and a part of magnet side surface 5C of magnet 5 are fixed to cavity 3C through sheet adhesive 13. In the subsequent step of connecting magnetic yoke 7, therefore, the other main surface 5B of magnet 5 to which magnetic yoke 7 is to be connected is kept fixed to bottom surface 3C1 of cavity 3C, and a part of magnet side surface 5C is kept fixed to side surface 3C2 of cavity 3C through sheet adhesive 13. As a result, in nonreciprocal circuit element 100 in the present embodiment, cavity 3C is formed, and at least a part of magnet 5 is disposed so as to be stored and connected in cavity 3C.

That is, in the method of manufacturing nonreciprocal circuit element 100 in the present embodiment, the step of connecting magnet 5 in cavity 3C stabilizes the posture of magnet 5 held in dielectric component 3. With this stable posture, magnetic yoke 7 is connected on magnet 5. This can prevent magnet 5 from being displaced so as to repel because of magnetic force during the operation of installing magnetic yoke 7 on magnet 5, in transition from FIG. 13(A) to FIG. 13(B), thereby improving the easiness of assembly, That is, element body 100A of nonreciprocal circuit element 100 can be assembled stably and easily using an automechanism with a simple facility configuration in which cavity 3C is merely provided in dielectric component 3, without employing a complicated facility configuration.

In the present embodiment, cavity 3C is formed in dielectric component 3 whereby magnet 5 can be fixed from both of the up-down direction opposed to the bottom surface 3C1 of cavity 3C and the right-left direction opposed to side surface 3C2, This configuration can further increase the reliability of the fixed state of magnet 5. Since magnet 5 can be adhesively fixed so as to be encircled by side surface 3C2 of cavity 3C in a two-dimensional view, the possibility of stress concentration in the bonded surface can be reduced, and progress of interface separation from the bonded surface can be suppressed. This can also improve the reliability of the connected part.

Second Embodiment

Figure 18:
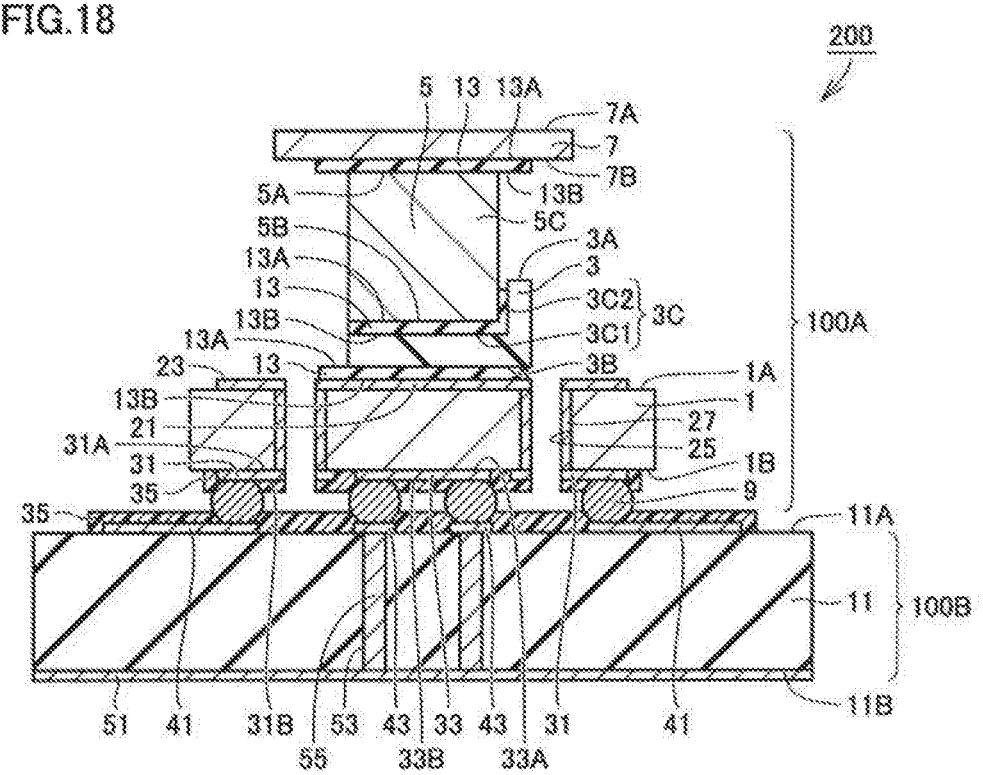
FIG. 18 is a schematic cross-sectional view showing a configuration of a nonreciprocal circuit element in a second embodiment.

Referring to FIG. 18, a nonreciprocal circuit element 200 in the present embodiment basically has a configuration similar to nonreciprocal circuit element 100 in the first embodiment. For nonreciprocal circuit element 200, the same components as those in nonreciprocal circuit element 100 are denoted by the same reference signs and a description thereof will not be repeated. In nonreciprocal circuit element 200 in the present embodiment, however, side surface 3C2 of cavity 3C formed in dielectric component 3 includes a missing portion at a part of the periphery of magnet 5 in a two-dimensional view.

Figure 19:
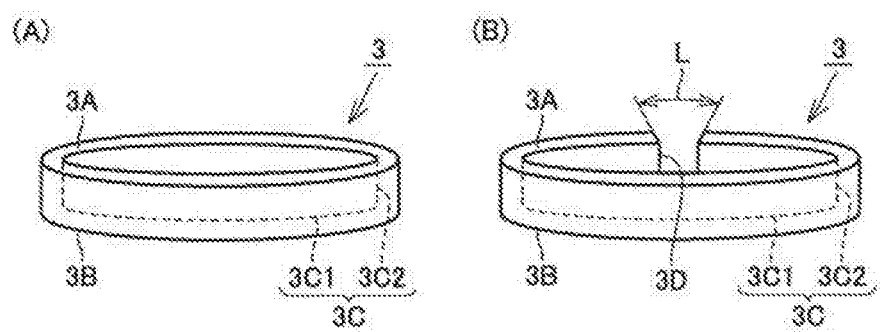
FIG. 19 is a schematic perspective view for comparing the appearance between a dielectric component (A) in the first embodiment and a dielectric component (B) in the second embodiment.

Referring to FIG. 19(A), for example, dielectric component 3 included in nonreciprocal circuit element 100 in the first embodiment has side surface 3C2 of cavity 3C that surrounds (encircle) the entire periphery in a two-dimensional view of magnet 5 stored therein, By contrast, referring to FIG. 19(B), for example, dielectric component 3 included in nonreciprocal circuit element 200 in the present embodiment is configured such that side surface 3C2 of cavity 3C does not surround the entire periphery in a two-dimensional of magnet 5 stored therein but surrounds only a part of it and has a missing portion 3D in the other part to expose magnet side surface 5C to the outside. In this respect, the present embodiment differs from the first embodiment.

The operation effect of the present embodiment will now be described. For example, bubbles may remain in sheet adhesive 13 affixed to connect magnet 5 in cavity 3C. If dielectric component 3 and magnet 5 are connected using sheet adhesive 13 containing such bubbles, the bubbles are sandwiched in a region between dielectric component 3 and magnet 5, so that magnet 5 may be connected, for example, at an angle relative to the vertical direction in which magnet side surface 5C should essentially extend. Such inclination of magnet side surface 5C affects the electrical characteristics of the nonreciprocal circuit element and, therefore, it is preferable that this is installed so as to extend as vertically as possible. Then, as in the present embodiment, the configuration in which side surface 3C2 of cavity 3C partially includes missing portion 3D enables bubbles in sheet adhesive 13 to escape to the outside through missing portion 3D during bonding. This configuration therefore stabilizes the electrical characteristics of nonreciprocal circuit element 200 and improves its quality.

In missing portion 3D of cavity 3C, dimension L relative to the dimension in the circumferential direction of the circular shape (around the circle) in a two-dimensional view is preferably 10% to 70% of the entire periphery. Missing portion 3D is formed with a dimension equal to or greater than 10% of the entire periphery, whereby bubbles can escape smoothly from missing portion 3D as described above. Missing portion 3D having a dimension equal to or smaller than 70% of the entire periphery can ensure the minimum side surface area of the fixed portion required to achieve the effect of preventing displacement by fixing side surface 3C2 and magnet 5.

Third Embodiment

Figure 20:
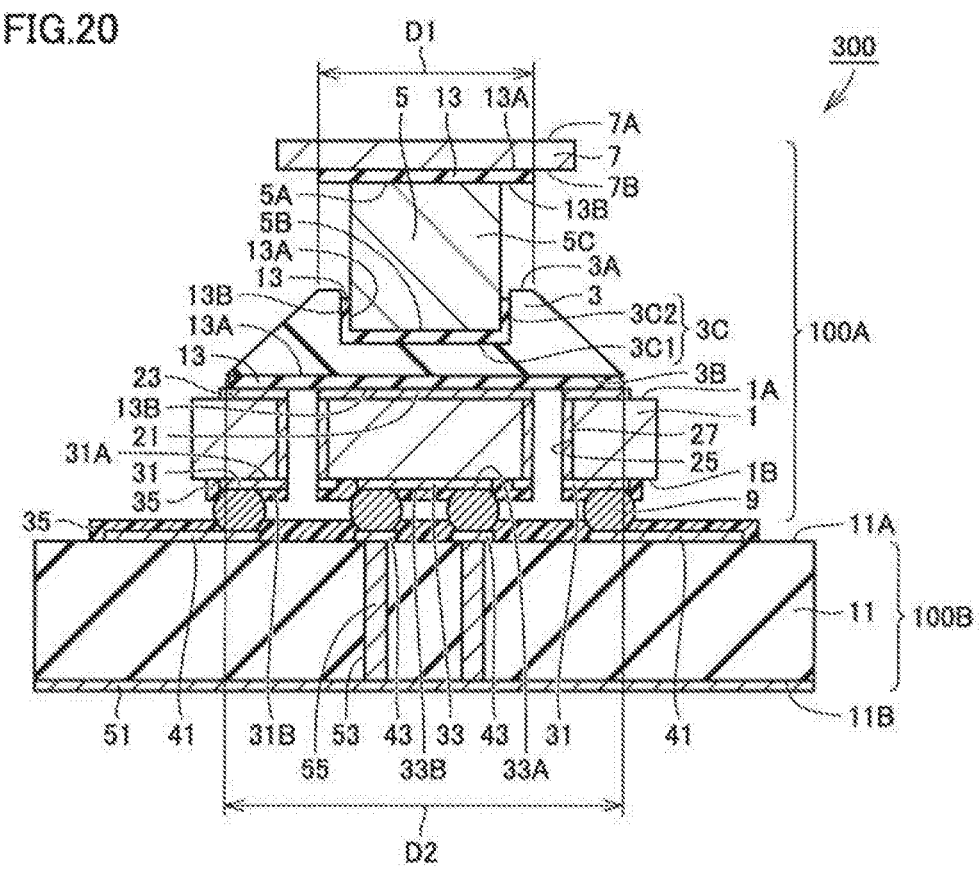
FIG. 20 is a schematic cross-sectional view showing a configuration of a nonreciprocal circuit element in a third embodiment.

Referring to FIG. 20, a nonreciprocal circuit element 300 in the present embodiment basically has a configuration similar to nonreciprocal circuit element 100 in the first embodiment. For nonreciprocal circuit element 300, the same components as those in nonreciprocal circuit element 100 are denoted by the same reference signs and a description thereof will not be repeated. In nonreciprocal circuit element 300 in the present embodiment, however, dielectric component 3 is sized such that dimension D2 with respect to the right-left direction along one main surface 1A on the magnetic plate 1 side, that is, on the lower side in the figure is larger than dimension D1 with respect to the right-left direction along one main surface 1A of magnetic plate 1 on the magnet 5 side, that is, the upper side in the figure. In other words, in nonreciprocal circuit element 300 in the present embodiment, width D2 in the horizontal direction of dielectric component 3 on the other main surface 3B side, that is, the lowermost portion is larger than width D1 in the horizontal direction of dielectric component 3 on one main surface 3A side, that is, the uppermost portion.

Figure 21:
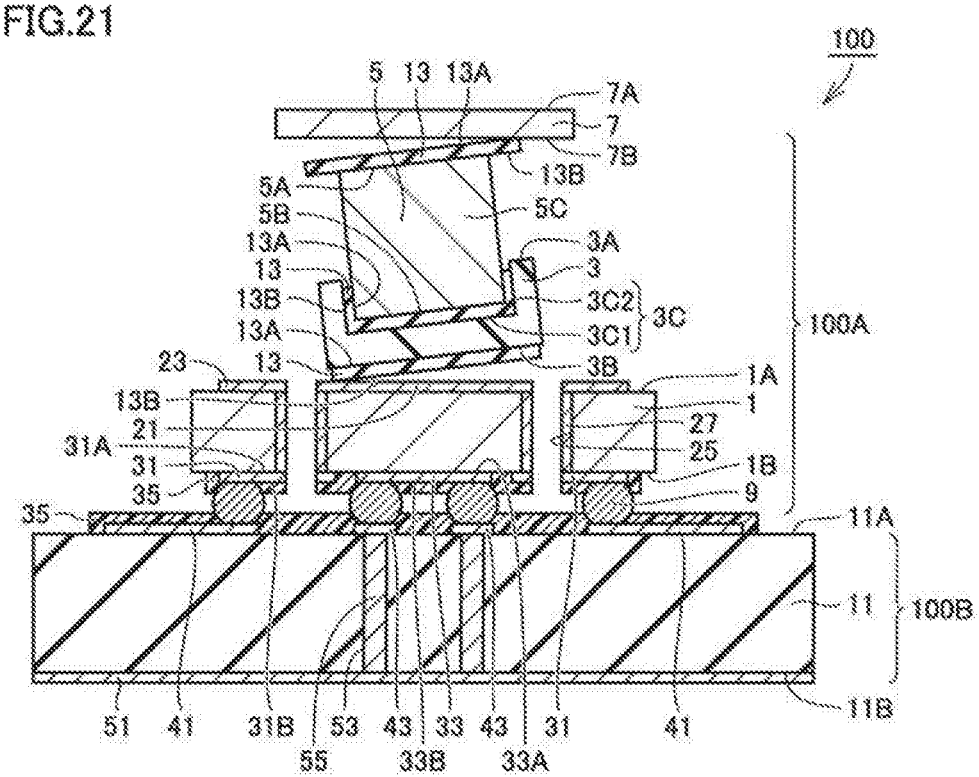
FIG. 21 is a schematic cross-sectional view showing inconvenience that may occur in the nonreciprocal circuit element in the first embodiment.

For example, dielectric component 3 included in nonreciprocal circuit element 100 in the first embodiment has a cylindrical shape such that its width in the horizontal direction does not substantially change from one main surface 3A to the other main surface 3B. By contrast, dielectric component 3 included in nonreciprocal circuit element 300 in the present embodiment has a conical shape such that its width in the horizontal direction gradually increases from the one main surface 3A side toward the 2h other main surface 33 side. In this respect, the present embodiment differs from the first embodiment, The operation effect of the present embodiment will now be described. Referring to FIG. 21, for example, when dielectric component 3 has a cylindrical shape as in nonreciprocal circuit element 100 in the first embodiment, cavity 3C has the effect of suppressing dropping of magnet 5 from dielectric component 3 in the step of installing magnetic yoke 7 on one main surface 5A of magnet 5 (see FIG. 13(B)) as described above. However, in nonreciprocal circuit element 100 in the first embodiment, dielectric component 3 having magnet 5 fixed thereto in FIG. 21 may drop off from one main surface 1A of magnetic plate 1. In this respect, nonreciprocal circuit element 100 in the first embodiment may have a room for improvement in adhesion of dielectric component 3 to magnetic plate 1.

The configuration of nonreciprocal circuit element 300 in the present embodiment can further enhance adhesion of dielectric component 3 to magnetic plate 1, compared with nonreciprocal circuit element 100. This is because dimension D2 in FIG. 20 is larger than dimension D1 in nonreciprocal circuit element 300 so that the area of the bonded portion between dielectric component 3 and magnetic plate 1 is greater than in nonreciprocal circuit element 100.

Dimension D2 at the lowermost portion of dielectric component 3 in FIG. 20 is preferably twice to five times larger than dimension D1 of the uppermost portion of dielectric component 3, Considering the dimensional relation between magnet 5 and magnetic plate 1, the above numerical range of dimension is derived. The dimensional relation between magnet 5 and magnetic plate 1 is determined by the electrical factors rather than by the mechanical factors. Thus, considering the electrical characteristics, dimension D2 is designed to be twice to five times larger than dimension D1.

The technical features of the foregoing embodiments (examples) may be combined as appropriate as long as a technical contradiction is not produced.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 magnetic plate, 1A, 3A, 5A, 7A, 13A one main surface, 1B, 3B, 5B, 7B, 13B the other main surface, 3 dielectric component, 3C cavity, 3C1 bottom surface, 3C2 side surface, 5 magnet, 5C magnet side surface, 7 magnetic yoke, 9 solder bump, 11 circuit board, 13 sheet adhesive, 21 center electrode, 23 interconnect, 25, 53 through hole, 27, 55 conductive film, 31 input/output terminal, 33 ground electrode, 35 solder resist, 41 pad electrode, 43 circuit board center electrode, 51 back-surface electrode, 100, 200 nonreciprocal circuit element, 100A element body, 100B mounting board, 101 hotplate. 112 release film, 113 roller, 114 special tray, 115 suction nozzle. 116 assembly stage, 1160 vacuum suction portion, 117 pressure clip, 118 flux.

The invention claimed is:

1. A nonreciprocal circuit element comprising:
 a magnetic plate having one main surface and another main surface on a side opposite to the one main surface and having a plurality of input/output terminals;
 a dielectric component connected on the one main surface of the magnetic plate;
 a permanent magnet connected to the dielectric component on a side opposite to the magnetic plate;
 a magnetic yoke connected to the permanent magnet on a side opposite to the magnetic plate; and
 a circuit board connected to the other main surface side of the magnetic plate and having a plurality of signal conductors, wherein
 a cavity is formed in a surface of the dielectric component on the permanent magnet side, the cavity having a bottom surface extending in a direction along the one main surface and a side surface extending in a thickness direction crossing the bottom surface, at least a part of the permanent magnet is disposed in the cavity, and
 a surface of at least a part of the permanent magnet disposed in the cavity is fixed to both of the bottom surface and the side surface through an adhesive, wherein
 the magnetic plate includes a plurality of through holes connecting the one main surface with the other main surface.

2. The nonreciprocal circuit element according to claim 1, wherein the side surface of the cavity includes a missing portion at a part of periphery of the permanent magnet in a two-dimensional view.

3. The nonreciprocal circuit element according to claim 1, wherein a dimension of the dielectric component in a direction along the one main surface on the magnetic plate side is larger than a dimension of the dielectric component in a direction along the one main surface on the magnet side.

4. The nonreciprocal circuit element according to claim 1, wherein the dielectric component is connected to the magnetic plate on the inside of the through holes in a two-dimensional view.

5. The nonreciprocal circuit element according to claim 1, wherein
 the circuit board has pad electrodes,
 the magnetic plate has a ground electrode, and
 the pad electrodes are electrically connected with the input/output terminals and the ground electrode.

6. A method of manufacturing a nonreciprocal circuit element, the method comprising the steps of:
 forming a magnetic plate having one main surface and another main surface on a side opposite to the one main surface and having a plurality of input/output terminals;
 connecting a dielectric component on the one main surface of the magnetic plate;
 connecting a permanent magnet to the dielectric component on a side opposite to the magnetic plate;
 connecting a magnetic yoke to the permanent magnet on a side opposite to the magnetic plate; and
 connecting a circuit board having a plurality of signal conductors to the other main surface side of the magnetic plate, wherein
 a cavity is formed in the dielectric component on a side connected with the permanent magnet, the cavity having a bottom surface extending in a direction along the one main surface and a side surface extending in a thickness direction crossing the bottom surface, and
 in the step of connecting a permanent magnet, a surface of at least a part of the permanent magnet disposed in the cavity is fixed to both of the bottom surface and the side surface through an adhesive, in a state in which at least a part of the permanent magnet is disposed in the cavity, wherein
 the magnetic plate includes a plurality of through holes connecting the one main surface with the other main surface.

7. The method of manufacturing a nonreciprocal circuit element according to claim 6, wherein the step of connecting a magnetic yoke is performed while a surface of at least a part of the permanent magnet is kept fixed to both of the bottom surface and the side surface through the adhesive.

* * * * *